(12) United States Patent
Turner et al.

(10) Patent No.: US 7,254,610 B1
(45) Date of Patent: Aug. 7, 2007

(54) DELIVERY OF SERVICES TO A NETWORK ENABLED TELEPHONY DEVICE BASED ON TRANSFER OF SELECTED MODEL VIEW CONTROLLER OBJECTS TO REACHABLE NETWORK NODES

(75) Inventors: Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 09/955,017

(22) Filed: Sep. 19, 2001

(51) Int. Cl.
*G06F 15/16* (2006.01)
*G06F 3/00* (2006.01)
(52) U.S. Cl. .................. 709/204; 715/700; 719/315
(58) Field of Classification Search ............... 709/223, 709/230, 203, 204, 206; 707/103 R; 715/700; 717/116; 719/315
See application file for complete search history.

(56) References Cited

U.S. PATENT DOCUMENTS

| | | | |
|---|---|---|---|
| 5,926,177 A * | 7/1999 | Hatanaka et al. ........... 715/747 |
| 6,161,136 A * | 12/2000 | Hyndman et al. .......... 709/223 |
| 2002/0023147 A1 * | 2/2002 | Kovacs et al. ............. 709/219 |
| 2002/0194388 A1 * | 12/2002 | Boloker et al. ............ 709/310 |
| 2003/0023953 A1 * | 1/2003 | Lucassen et al. .......... 717/106 |
| 2004/0210635 A1 * | 10/2004 | Raniere et al. ............ 709/204 |

OTHER PUBLICATIONS

Copending U.S. Appl. No. 09/883,211, filed Jun. 19, 2001.
Copending U.S. Appl. No. 09/908,578, filed Jul. 20, 2001.

* cited by examiner

*Primary Examiner*—Jason Cardone
*Assistant Examiner*—Tanim Hossain
(74) *Attorney, Agent, or Firm*—Leon R. Turkevich

(57) ABSTRACT

Advanced communication services are deployed for a user device, such as a VoIP telephony device, based on utilizing a model view controller architecture within a network system (e.g., a VoIP system) configured for communication with the VoIP telephony device. The VoIP telephony device and a service node of the VoIP system each are configured for executing at least one corresponding model object, view object, and controller object of a prescribed network service. The model object, view object, and controller object each are configured for utilizing transaction-based messages associated with the prescribed network service. Moreover, the service node is configured for selectively transferring any one of the model object, view object, and the controller object to another node, for example the VoIP telephony device or another network node, and terminating execution of the transferred object, without interruption in service for the user.

28 Claims, 6 Drawing Sheets

DELIVERY OF SERVICES TO A NETWORK ENABLED TELEPHONY DEVICE BASED ON TRANSFER OF SELECTED MODEL VIEW CONTROLLER OBJECTS TO REACHABLE NETWORK NODES

BACKGROUND OF THE INVENTION

1. Field of the Invention

The present invention relates to network enabled telephony devices, for example Voice over IP Telephones, configured for executing applications related to attributes of a telephony user.

2. Description of the Related Art

Telephony devices have advanced to provide enhanced features for business consumers. For example, a business premises deploying a Private Branch Exchange (PBX) for intraoffice or interoffice communications utilizes telephony devices capable of receiving messages from the PBX, including a time of day string or a calling party identity string. However, proprietary PBX systems limit the availability of features that can be added to the telephony device. In addition, proprietary PBX systems typically provide voice-only services, such that text, data, or images cannot be transferred to the telephony device.

Voice over IP (VoIP) technology has evolved to provide network enabled telephony devices, for example Voice over IP telephony devices, configured for performing multiple operations that emulate a telephony device. VoIP telephony devices often include large display screens or other display capabilities, enabling new service features to be provided for a user. For example, the VoIP telephones, such as the commercially-available Cisco Telecaster 7960 IP Telephone from Cisco Systems, San Jose, Calif., includes user input and display operations. These user input and display operations enable a user to access multiple windows displaying respective applications based on soft key or hard key inputs, such as accessing a central telephone directory for retrieval of an employee's telephone number using a search query or selection from the displayed list. A user of the VoIP telephone can access one window configured displaying call status (e.g., duration of call, called party identity), or access another window configured for displaying the central telephone directory.

The executable software resident in the VoIP telephone, however, tends to be device-specific. Hence, the executable software needs to be rewritten for newer VoIP telephones having different hardware configurations (e.g., different sets of hard buttons, color display vs. grayscale display, different-sized display, etc.), although compatibility issues may be reduced using hardware abstraction layers and input abstraction layers between the telephone display controller, the display portion, and the input portion. Moreover, the device-specific nature of the VoIP telephone software limits the manner in which different application services can be added to the VoIP telephone device for the device user: the VoIP telephone software needs to be modified to add the different application services. In addition, the VoIP telephone typically is configured for communication with a single call server, resulting in additional resource requirements imposed on the call server as services are added.

Efforts are underway to improve the graphical user interface (GUI) of the telephony devices in order to enable additional services to be provided to a user of the telephony device. For example, browser-based telephony device technology is being implemented in wireless telephones using Wireless Application Protocol (WAP). In particular, WAP uses Extensible Markup Language (XML) technology to communicate interface changes to wireless devices such as digital wireless telephones and pagers, enabling applications and services to be provided to the digital wireless telephones. The use of XML tags enables the data to be displayed on the digital wireless telephone display in a prescribed manner.

The WAP-based approach to displaying data on the digital wireless telephone still suffers from the disadvantage that the input and display controllers of the digital wireless telephone interact with a single WAP portal (i.e., server), limiting the flexibility of the telephony device operations. In particular, a user is unable to send or receive a wireless telephone call on his or her web-enabled digital wireless telephone while using the digital wireless telephone to access the Internet. In addition, the VoIP telephone typically is configured for communication with a single call server, resulting in additional resource requirements imposed on the call server as services are added.

Hence, existing VoIP technology is limited in the available services due to the control of services by a remote server. Consequently, existing VoIP systems have had limited flexibility in providing advanced services to a VoIP telephony device.

"Model view controller" is an architecture used for dividing a graphic user interface (GUI) based application into three logical parts: the model object, the view object, and the controller object. The model view controller paradigm was originally developed to map traditional input, processing, and output operation into a GUI based paradigm. The model object includes logic for managing information, notifying observers when information changes, and responding to information queries. The model object is used to serve as a computational abstraction of a executable processor system, and defines the state and logic of the process.

The view object is configured for mapping (i.e., rendering) data such as text and/or graphics onto a device. Changes to a model object causes the view object to automatically redraw the affected part of the image to reflect the changes. In addition, multiple view objects for the same model may be utilized to render the contents of the model object according to a different corresponding display (e.g., data table, monthly chart view, daily chart view, linear scale, logarithmic scale, etc).

The controller object provides the means by which the user interacts with the application; the controller object accepts input from the user, and instructs the model object and the view object to perform actions based upon the user input, effectively mapping user inputs to application response. Examples of a controller object include controllers for buttons, microphones, and sensors.

Use of the model view controller architecture typically has been limited to instances where GUI interfaces may be utilized for different hardware configurations (e.g., different displays, different input devices) by substituting the corresponding view object or controller object, without the necessity for changing the model object.

SUMMARY OF THE INVENTION

There is a need for an arrangement that enables users of network-enabled telephony devices to enjoy enhanced communications services based on dynamic transfer of service objects, used to perform prescribed operations for a corresponding service, between a node on the network and the network-enabled telephony device.

There also is a need for an arrangement that enables a network-based service, selectable by a user, to be transferred from one device to a second device, based on a prescribed condition and without any interruption in the service for the user.

These and other needs are attained by the present invention, where advanced communication services are deployed for a user device, such as a VoIP telephony device, based on utilizing a model view controller architecture within a network system (e.g., a VoIP system) configured for communication with the VoIP telephony device. The VoIP telephony device and a service node of the VoIP system each are configured for executing at least one corresponding model object, view object, and controller object of a prescribed network service. The model object, view object, and controller object each are configured for utilizing transaction-based messages associated with the prescribed network service. Moreover, the service node is configured for selectively transferring any one of the model object, view object, and the controller object to another node, for example the VoIP telephony device or another network node, and terminating execution of the transferred object, without interruption in service for the user.

Hence, network based services can be provided to a user based on dynamic transfer of selected service objects (e.g., model object, view object, and/or controller object) to a selected network node, without any interruption in service perceived by the user. Hence, execution of service operations for a network based service can be transferred between a service node, a client device, and/or another network node for optimum resource allocation, with no interruption in service perceived by the user.

One aspect of the present invention provides a network-enabled user interface device. The device includes at least one user interaction component, namely a user input resource configured for receiving user inputs and/or a display controller configured for display of data, a network interface, and a controller. The network interface is configured for receiving, via an open protocol network, information associated with a first network service. The first network service is supplied to the user based on exchange of service transaction messages between a corresponding group of service objects including a model object, a view object, and a controller object associated with the first network service. The network interface is configured for receiving a corresponding one of the service objects based on the at least one user interaction component. The controller is configured for executing the received one service object for providing the first network service to the user based on the exchange of the service transaction messages, and selectively terminating the received one service object based on reception, via the network interface, of a second service object for a corresponding second network service. Hence, the network-enabled user interface device can provide different network services to the user based on receipt of a corresponding single service object relative to the nature of the user interaction component within the user interface device. Hence, maximum flexibility can be attained based on executing a single service object within the user interface device, where the remaining service objects may be distributed throughout the network on other network nodes.

Another aspect of the present invention provides an open protocol network configured for providing network services to a user. The network includes a network-enabled user interface device configured for user interaction by at least one of receiving user inputs and displaying data. The network also includes a service node configured for configuring the network-enabled user interface device to provide a first network service. The first network service is generated based on exchange of service transaction messages by associated service objects including a model object, a view object, and a controller object. In particular, the service node is configured for supplying to the network-enabled user interface device at least one of the service objects based on the user interaction capabilities of the network-enabled user interface device. The service node also is configured for transferring a selected service object between any one of the service node (i.e., itself), the network-enabled user device, and a second network node based on a prescribed condition and while maintaining a user-perceived continuous service of the first network service. Hence, network services can be provided to a user interface device in a manner in which executable resources can be dynamically transferred between network nodes without providing any interruption in service for the user. Hence, dynamic based services can be provided to a user requiring robust (i.e., fault-tolerant) services.

In addition, use of model, view, and controller objects distributed across multiple nodes of a network enables multiple protocols to be deployed within a network, merely by supplying the appropriate view object and/or controller object, whereas the model object need not be modified.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for providing independent control of service objects, including a model object, a view object and a controller object, based on exchange of service transaction messages that enable transactions to be performed by the respective service objects to generate a network based service, for example instant messaging. The use of service transaction messages exchanged between service objects enables the distribution of the service objects across respective network nodes. Moreover, the independent control of service objects enables a service object to be dynamically transferred (i.e., while services are being provided to the user) to another network node, while maintaining a user-perceived continuous service (i.e., without the user perceiving any interruption in the network service). A simplified description will first be provided of model view controller technology implemented in a network-enabled user interface device, for example a Voice over IP telephone, followed by a description of the arrangement for utilizing independent control of service objects to provide dynamic execution of instant messaging type applications in a VoIP telephony device.

Figure 1A:
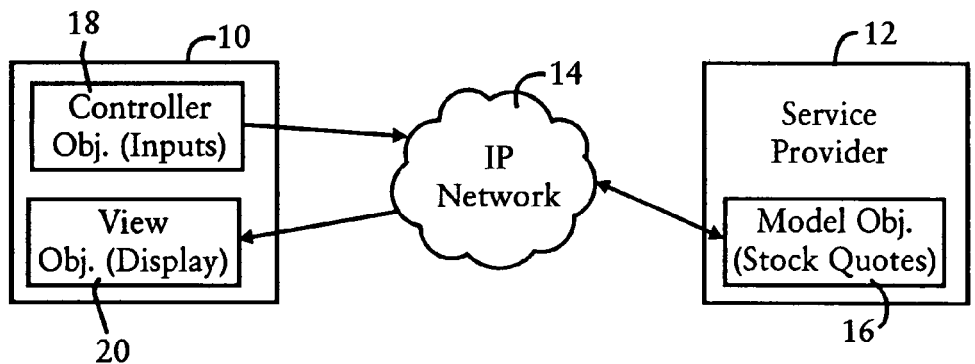
FIGS. 1A and 1B are block diagrams illustrating deployment of a model view controller architecture within a Voice over IP network.

FIG. 1A is a block diagram illustrating an open protocol network 5 configured for providing network services to a user. The network 5 includes a network-enabled user interface device 10, a service node 12 configured for providing network based services, for example voice over IP telephony and instant messaging services, described below, and an open protocol network 14 for exchanging messages between the client device 10 and the service node 12. The voice over IP telephony device 10 is configured for receiving arbitrary applications downloaded via the IP network 14, for example as described in detail in commonly assigned, copending application Ser. No. 09/883,211, filed Jun. 19, 2001, entitled "ARRANGEMENT FOR DELIVERING APPLICATIONS TO A NETWORK ENABLED TELEPHONY DEVICE", the disclosure of which is incorporated in its entirety herein by reference.

Application services for the telephony device 10 typically may be implemented by loading an executable resource into the non-volatile memory (e.g., ROM) of the voice over IP telephony device 10; during execution of the executable code, the voice over IP telephony device may initiate a network service by issuing a request to a prescribed destination (e.g., a call manager), serving as the server node for the client device 10. In fact, numerous commercially-available software resources are implemented as executable code intended for execution on a single client device based on interaction in a client-server arrangement. Such software resources integrate user interface operations (performed by a controller object), logic and algorithmic operations (performed by a model object), and output display operations (performed by a view object). The integration of service operations into a single software resource, while convenient for a programmer, often imposes limitations in deployment based on device hardware (e.g., hardware dependent instructions based on available input keys or display features), or limitations on network deployment (e.g., establishing a default destination address for a dedicated server acting as a dedicated call manager for the client device 10). Hence, many commercially-available resources may be relatively inflexible in a network-based system that requires multiple resources to be executed on different network nodes.

Use of the model view controller paradigm segregates application operations for an application service into distinct components. As described below, a network service, for example instant messaging, is provided to a user based on exchange of service transaction messages between service objects, namely the model object, the view object, and the controller object. The view object is executed on a device capable of generating human-consumable data such as voice, text, images, indicator lights, etc. One exemplary device for executing the view object is the client telephony device 10, although the device executing the view object may be implemented as a device having an output for human detection, (also referred to as a user interaction component), a network interface configured for receiving the service transaction messages for the view object, and a controller configured for executing the view object based on the received service transaction messages. Hence, the view object may be executed by an IP-capable audio speaker, an IP-capable display, etc.

The controller object includes a set of operations which cause the application (e.g., the network service) state to change. Examples of a controller object include a user input resource (e.g., input controller) for responding to pressed buttons, microphones, and sensors; alternatively, the controller may be executed by a call manager, or other service configured for outputting a service transaction message in response to detecting a prescribed condition or event (e.g., a network failure, a temperature change, a timer, etc).

The model object contains the current state of the network service; for example, telephony applications may include connection status, call timer, phone number, volume settings, etc. An arbitrary application also may define its own state. Hence, the model object, the controller object, and the view object perform distinct operations in providing the necessary service to the user. As described below, use of service transaction messages exchanged between the group of service objects enables the service objects to be distributed across respective devices.

As illustrated in FIG. 1A, the service provider 12 includes an executable resource 16 configured as a model object for providing stock quote data in response to received requests. The client device 10 includes an input controller resource 18 configured as a controller object for outputting a request based on a user input, and a display controller 20 configured as a view object for displaying data according to prescribed formats. Hence, the controller object 18 sends service transaction message specifying a request to the model object 16; the model object 16 includes predefined routines (i.e., logic and data) enabling the retrieval of the requested data; the data is sent in a service transaction message output by the model object 16 to the view object 20, for example in the form of data table or an XML document. The display controller 20, serving as the view object, displays the stock quote data in a prescribed format, for example a table or a graph.

Figure 1B:
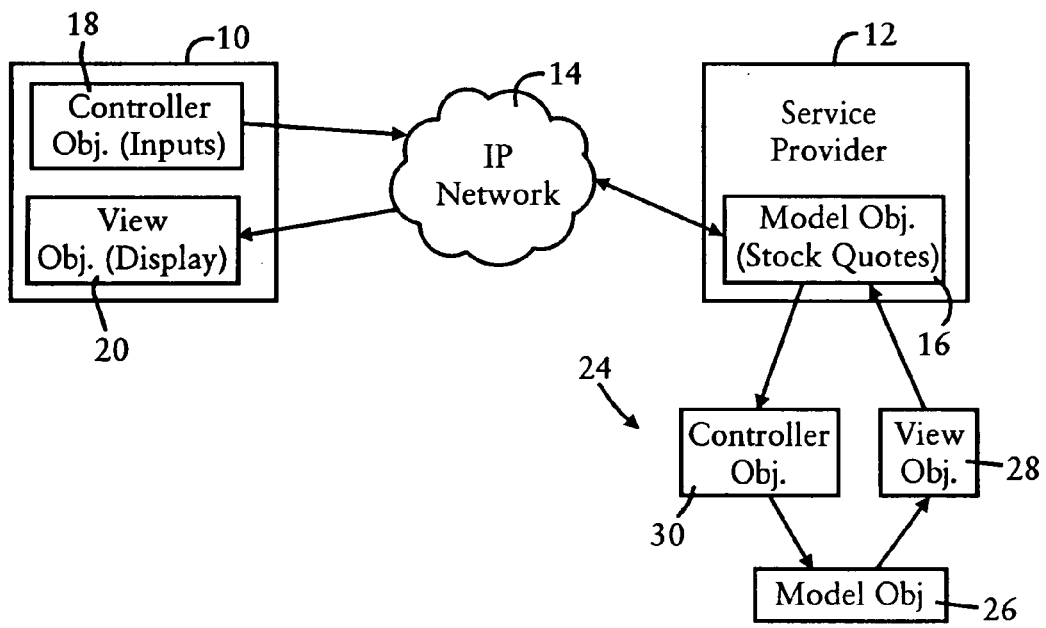

FIG. 1B is a diagram illustrating a variation where the service provider 12 utilizes a separate model-view-controller resource 24 for retrieval of the requested information by the client device 10. In this arrangement, the model object 16 acts as a web portal to access the requested information, in this case stock quotes. As illustrated in FIG. 1B, the stock quote resource 24 includes its own model object 26, view object 28, and controller object 30, for dynamically generating the requested data, for example where a model 16 utilizes a CGI script to send a request to the controller 30. The controller object 30 generates a request to the model object 26 in response to the model object 16 passing the CGI script request; as such, the controller object 30 serves as an entry point for the model object 16. The model object 26 is configured for dynamically reviewing the requested data, for example from a database or a data string. The model object 26 retrieves the requested stock quote information, and presents it to the view object 28. The view object 28 encapsulates the data in a prescribed format (e.g., an XML document or an HTML page), and forwards the data to the model object 16. The model object 16 outputs a service transaction message containing the data to the view object 20 for display on the user screen, according the particular hardware requirements of the user display.

Existing graphics interfaces utilizing the model-view-controller paradigm suffer from a design assumption that the model object, the view object and the controller object reside on a single client device or at least that two of the three components need to reside on the same device. Hence, the graphic interface resources inherently have limited flexibility, limiting the fault tolerance (i.e., robustness) that may be necessary due to a device failure. Hence, graphic interfaces will suffer a loss of service due to failure in a device executing the model, view and/or controller objects.

According to the disclosed embodiment, the model object, the view object, and/or the controller object provide a network-based service, for example instant messaging based on exchange of IP-based service transaction messages between each other, enabling each of the service objects to reside on a corresponding separate IP enabled device. Moreover, the transaction based nature of executing the application service enables any one of the objects to be transferred dynamically between network nodes during execution of the corresponding network service, without interruption of service for the intended user. Hence, a user can enjoy presence based services, for example instant messaging, in a manner in which application resources can be dynamically transferred between network nodes without interruption and service for the user.

Figure 2:
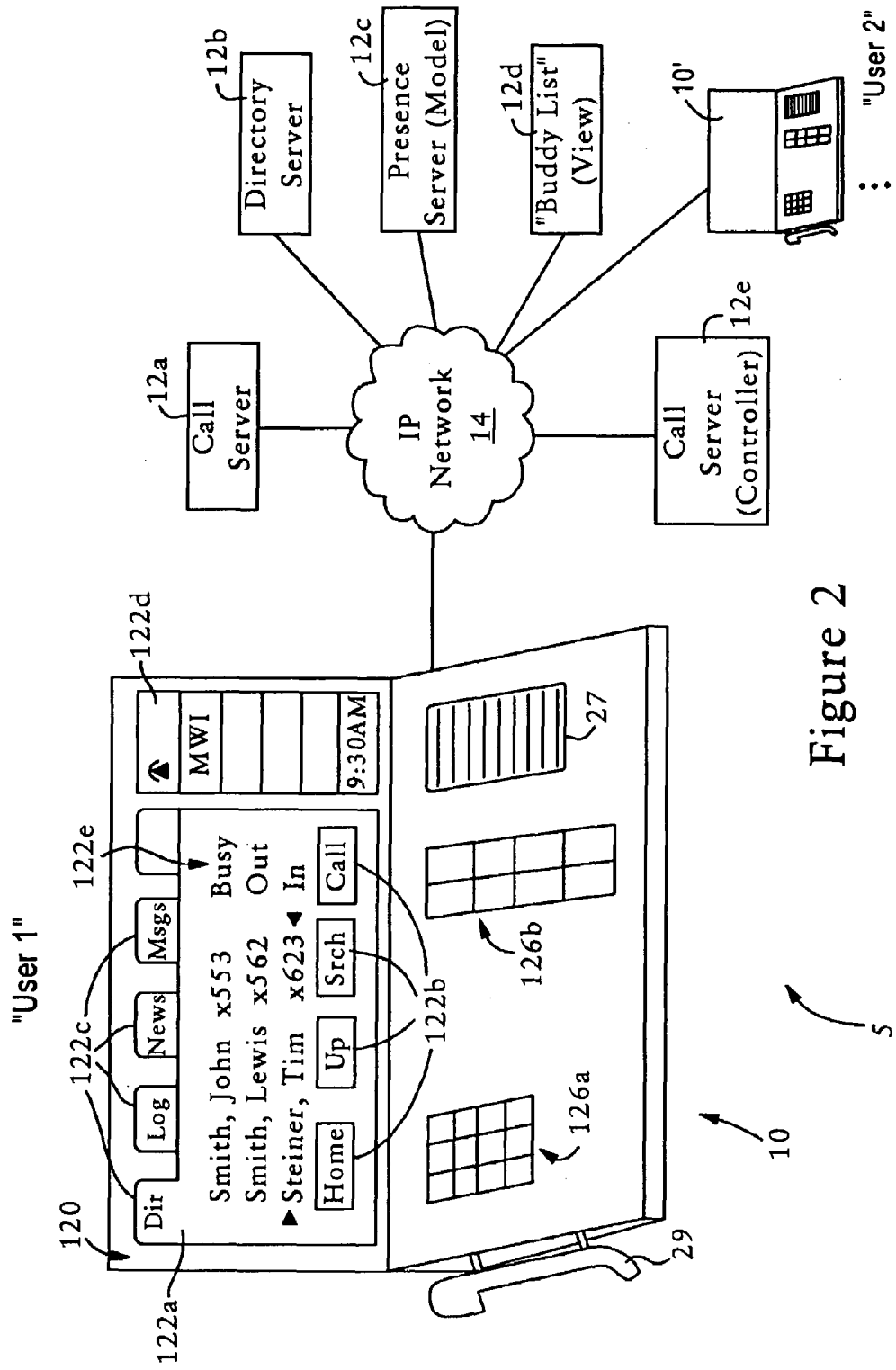
FIG. 2 is a block diagram illustrating a network configured for providing network services based on distributed execution of model, view, and controller objects according to an embodiment of the present invention.

FIG. 2 is a block diagram illustrating in further detail the network 5 for providing presence-based application services, based on distributed execution of service objects, to a network-enabled user interface device, for example a Voice over IP telephone device 10, according to an embodiment of the present invention. As shown in FIG. 2, the Voice over IP telephone device 10 is configured for communications via the IP network 14 with various nodes 12 and other Voice over IP telephone devices 10'. For example, the call servers 12a and 12e are configured for executing Voice over IP call processing applications according to a prescribed Voice over IP protocol, for example Media Gateway Control Protocol (MGCP) (RFC 2705), Session Initiation Protocol (SIP) (RFC 2543), H.323 protocol, etc. As described below, the call server 12e also may include a controller object implemented, for example, as a watchdog timer to determine whether the user connection for the client device 10 has been dropped; such a watchdog timer may be used to update presence information for buddy lists on instant messaging services, described below. The corporate directory server 12b is configured for providing, for example, corporate telephone directory lists or e-mail address lists, enabling a user of the Voice over IP device 10 to enter search queries based on name, location, reverse number search, etc. to identify the desired entry in the directory.

The system 5 also includes a presence server 12c, and a user-defined destination subscriber table (i.e., "buddy list") server 12d. The presence server 12c includes a model object that specifies the presence data for users identified within a subscriber's buddy list. The buddy list 12d includes a view object enabling other users to view the presence status of the subscriber 10. Additional details with respect to the use of the model, view, and controller by the network nodes 12c, 12d and 12e will be further described with respect to FIG. 4, described below.

The presence server 12c is configured for storing presence information received from the VoIP telephone devices 10, and supplying the presence information for identified users in response to queries. Note, however, that the operations described herein for the presence server 12c also may be performed by the individual VoIP devices 10, assuming the devices 10 are configured for exchanging presence information amongst each other.

The presence-based services provided by the VoIP telephone device 10, described below, are based on presence information specifying whether a user is determined to have a prescribed presence at a prescribed destination on the IP network 14. The term "presence" refers to a user's attributes relative to accessability at an identified destination configured as an endpoint on the IP network (e.g., having an IP address). Hence, the presence information for a user specifies the attributes that describe the nature in which the user is available (i.e., reachable) at the specified device. Additional details related to use of presence based services by the VoIP telephone device 10 are described in commonly assigned, copending application Ser. No. 09/908,578, filed Jul. 20, 2001, entitled "INTEGRATION OF PRESENCE SERVICES WITH A NETWORK ENABLED TELEPHONY DEVICE", the disclosure of which is incorporated in its entirety herein by reference.

As illustrated in FIG. 2, the Voice over IP telephone device 10 includes a display screen 120 configured for displaying display elements 122. For example, the display screen 120 may display an application window 122a having soft key buttons 122b for window-specific user input options. Additional display elements may be implemented as tab keys 122c that identify additional application services that may be selected by a user, where a user selects the corresponding application by pressing the corresponding tab 122c. Additional display elements may be implemented as telephone device elements 122d that may indicate device-specific state information, any one of which may be used to provide a hierarchal menu list based on pressing the corresponding soft key input. Additional display elements may include status icons 122e configured for identifying presence state information for the corresponding directory entry. The Voice over IP telephone device 10 also includes audio driver circuitry (not shown) for playing audio files to an external speaker 27 distinct from the telephone handset 29.

Figure 3:
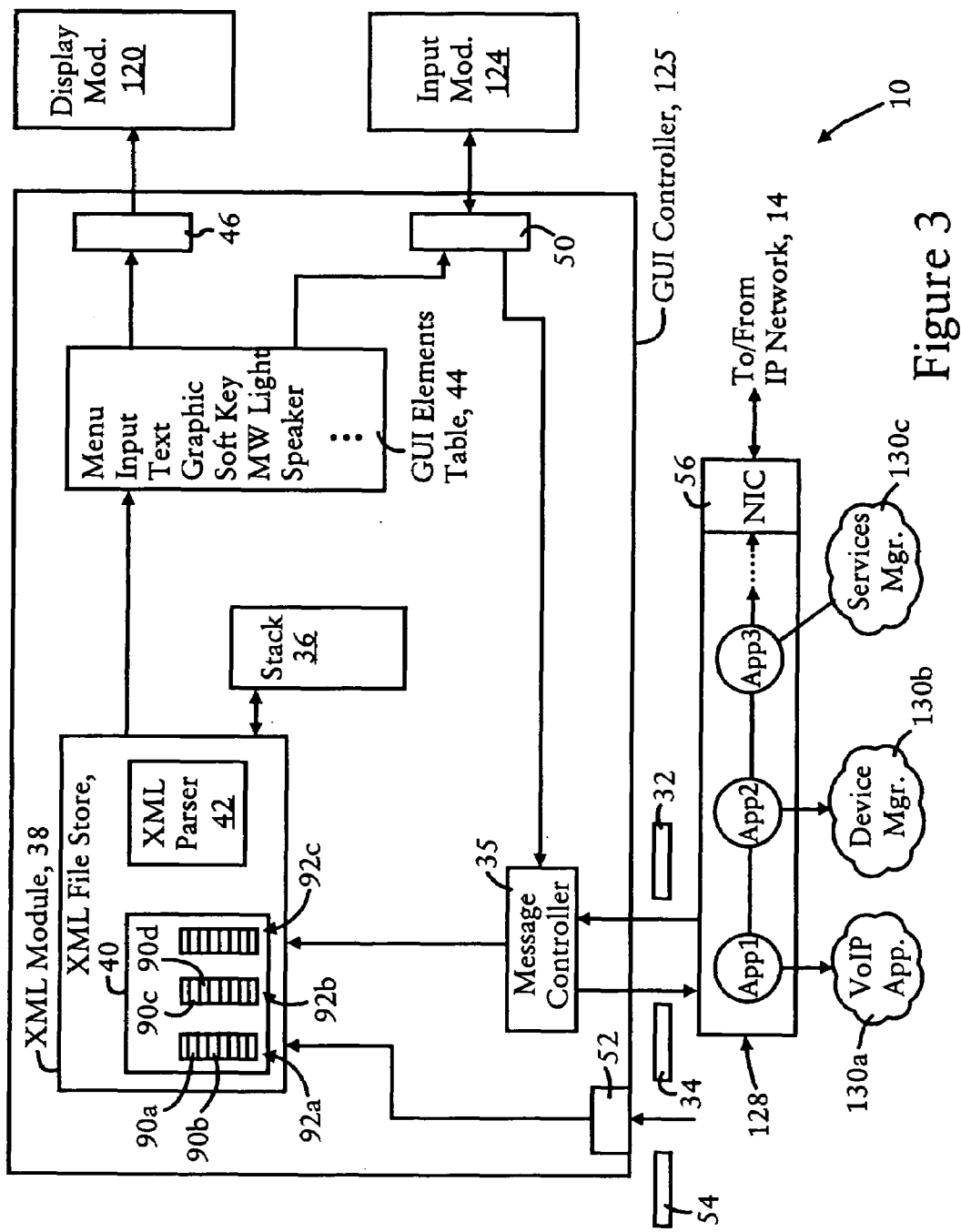
FIG. 3 is a diagram illustrating in detail the Voice over IP telephony device of FIGS. 1 and 2.

FIG. 3 is a diagram illustrating in further detail the Voice over IP telephony device 10 according to an embodiment of the present invention. The Voice over IP telephone device 10 includes a user input interface 124 configured for detecting user inputs to soft key elements (e.g., 122b, 122c, or 122d) or hard key elements 126, illustrated as a twelve button keypad 126a, and function keys 126b. Hence, the user input interface 124, illustrated in FIG. 3, is configured for enabling the soft keys and the hard keys 126 based on application-based commands, and supplying user inputs for processing by the appropriate executable applications, described below.

The Voice over IP telephone device 10 also includes a graphic user interface (GUI) controller 125, and an application controller 128. The Voice over IP telephone device 10 also includes locally executable applications 130, for example a communication resource 130a including a VoIP application configured for initiating and receiving Voice over IP based telephone calls between the call server 16a according to Voice over IP protocol, for example, Media Gateway Control Protocol (MGCP) (RFC 2705), Session Initiation Protocol (SIP) (RFC 2543), H.323 protocol, etc. Other examples of locally executable applications include a device manager 130b configured for managing local operation of the Voice over IP telephone device 10.

The GUI controller 125 is configured for receiving application-based commands (i.e., "requests") 32 from the application controller 128 that specify an application state (specified by an XML document 90) to be performed. For example, each application-based command 32 is received by the GUI controller 125 in the form of a text-based message (e.g., a service transaction message), and specifies at least one of a display operation that specifies display parameters for a display element 122, an input operation specifying an input operation for a soft key or a hard key by the user input interface 24, and/or response logic enabling the GUI controller 125 to determine how to respond to a prescribed user input supplied by the user input interface 24.

The GUI controller 125 also is configured for outputting application-based responses (i.e., "posts") 34 based on the supplied user inputs from the user input interface 124 and based on the application-based commands that specify the manner in which the posts 34 should be generated. Hence, each application service operates according to a request/response system (i.e., exchange of service transaction messages), enabling deployment of arbitrary application within the Voice over IP telephone device 10 based on standardized messaging protocols, described below.

The Voice over IP telephone device 10 implements application-specific messaging using extensible markup language (XML) documents 90, referred to as "application state documents", that are used to define the generic messaging protocol (i.e., command set) available to executable applications. In particular, the GUI controller 125 includes a stack 36, and an XML module 38. The XML module 38 includes an XML file store 40 for storing XML documents 90, and an XML parser 42 for parsing a selected XML document. Each XML document 90 corresponds to a specified state of an executable application (hence the term "application state document"), and may reference another XML document. Each XML document 90 includes XML tags that specify an operation to be performed: for example, XML tags can specify the manner in which display elements 122 are to be displayed, how input operations are to be performed by the user input interface 124, how inputs supplied by a user should be interpreted, how audio files should be played, etc.

Each XML document (e.g., 90*a*) specifies a prescribed application state, and may reference another XML document (e.g., 90*b*) that specifies another corresponding application state for the same executable application. Hence, the XML application state documents 90 are grouped into XML applications 92, where a group of application state documents 90 collectively define the XML-based application to be performed. Hence, the XML application state documents 90 are stored within an XML file store 40 in groups of XML applications 92*a*, 92*b*, and 92*c*. For example, the XML documents 90*a* and 90*b* specify respective states of the XML application 92*a*, and the XML documents 90*c* and 90*d* specify respective states of the XML application 92*b*.

The XML documents for a prescribed application typically are loaded in the XML file store 40 as default documents; alternately, newer application-specific XML documents 92 may be loaded into the XML file store 40 during registration of a new application service. The stack 36 is configured for storing active XML documents used by the GUI controller 125 for active applications.

The XML parser 42 is configured for generating display element identifiers specifying display elements to be displayed (i.e., display operations), input identifiers that specify the input operations to be performed by the user input interface 124, and any other identifiers specified during the selected XML document based on the application-specific commands 32 (e.g., video or audio operations).

In particular, the graphic user interface (GUI) controller 125 is configured for parsing the text strings 32 and recovering the application specific commands (e.g., the XML document identifiers), and forwarding the application-specific commands to the XML module 38. For example, the application specific command may specify the XML document 90 to be retrieved from the XML file store 40 and parsed to determine the interface elements to be applied. The XML parser 42, upon parsing the selected XML document, outputs the identifiers specified in the parsed XML document to a GUI elements table 44.

The GUI elements table 44 is configured for storing available interface elements, for example menu elements, input elements, text elements, graphic elements, soft key elements, hardware light elements, speaker elements, etc. Each GUI element specifies instructions and parameters that enable the generation of the corresponding interface operation. The GUI elements table 44 outputs the selected elements to a display abstraction interface 46 and/or an input abstraction interface 50, or the speaker 27 as appropriate. The display abstraction interface 46 is configured for generating display-specific images for display of the respective display elements by the display screen 120, and the input abstraction interface 50 is configured for generating hardware-specific commands for configuration of the user input interface for the respective selected input operations.

As described further below, model objects 16 can be executed by the application controller 128 (e.g., by the services manager 130*c*), view objects 20 can be executed by the XML module 38, and the controller objects 18 can be controlled by the message controller 35 using input definitions stored in the XML file store 40.

Hence, network based services can be implemented by supplying to the IP telephony device 10 a model object 16, a view object 20, or a controller object 18. The model object 16, which specifies application logic and application state, may be implemented as executable code within the application controller 128; alternately, the model object 16 may be stored as a sequence of XML documents 92, where each XML document 90 specifies a corresponding application state relative to referenced data variables. The controller object 18 may be implemented based on a corresponding set 92 of XML documents 90 that define actions to be performed in response to user inputs to the input module 124; in other words, the controller object 18 is implemented using XML documents 90 that specify the elements of the GUI elements table 44 that define the operation to be performed based on the user pressing a given input key 122 or 126 as detected by the input modules. The message controller 35, in response to detecting the user input as defined by the appropriate XML documents 90, generates the appropriate service transaction message 34 for the corresponding model object 16. If the model object 16 is executed locally, the model object 16 (implemented either in the XML module 38 or the services manager 130*e*) executes the corresponding model objects; however, if the model object 16 is remote to the device 10, the network interface controller 56 outputs the service transaction message 34 to the appropriate destination 10' or 12 executing the model object 16.

Similarly, the view object 20 can be implemented using the XML document 90 in order to display content as specified by the network service.

Hence, the local and remotely executed applications control the user interface of the Voice over IP telephone device 10 by sending text-based messages to the GUI controller 125; the text-based messages are used to identify an XML document 90, stored in the XML file store 40, to be parsed for identification of display elements and selected input operations to be provided to the display screen 120 and the user input interface 124, respectively. Specific data defining the display element and the input operations are retrieved from the GUI element table 44 and forwarded to the appropriate hardware abstraction interface 46 or 50. The hardware abstraction interfaces convert the supplied GUI elements to hardware-specific instructions to cause the display screen 120 and the user input interface 124 to provide the appropriate interface elements.

The GUI controller 125 also includes a messaging interface 52 configured for receiving event messages 54, composed of text-based messaging. In particular, the event messages are time-oriented messages that specify the occurrence of prescribed events, for example a one second timer for updating the time display element, or other time-oriented messages occurring independently of local or remote application states, for example pop-up messages. The event messages may be sent by local or remote controller objects 18 either to the XML module 38 for parsing a prescribed XML document 90 (e.g., for playing an audio or video announcement), or to the GUI elements table 44 for generation of a display element including the supplied text. Additional details related to the XML based control of the GUI controller 125 are disclosed in the above-incorporated application Ser. No. 09/883,211.

Figure 4:
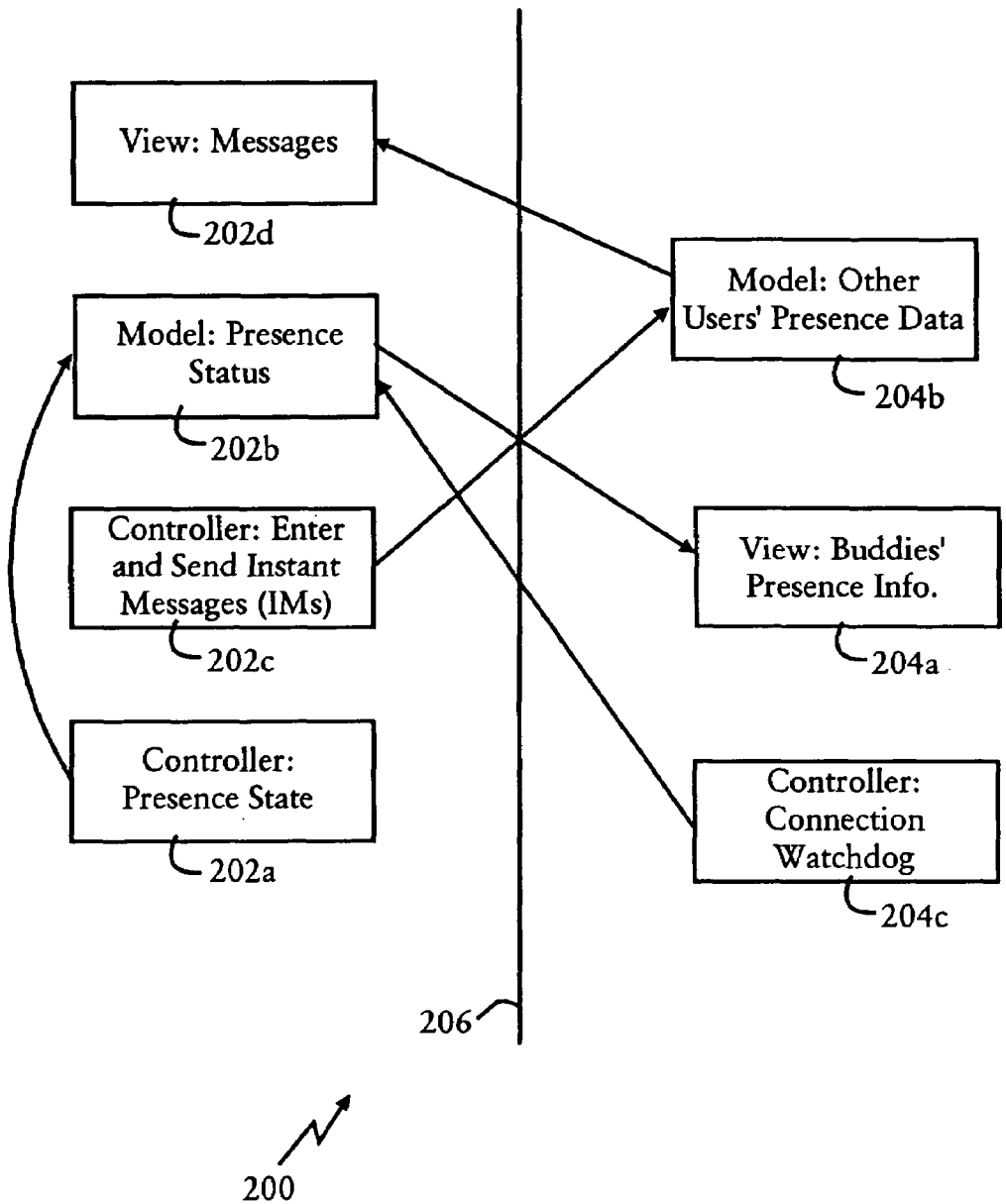
FIG. 4 is a diagram illustrating execution of service objects locally, and remotely relative to a Voice over IP telephony device, for implementing network based services such as instant messaging based on executing selected service objects, according to an embodiment of the present invention.

FIG. 4 is a diagram illustrating execution of service objects locally, and remotely relative to the Voice over IP telephony device 10, in order to provide network based instant messaging services utilizing the Voice over IP telephony device 10 according to an embodiment of the present invention. In particular, the arrangement of FIG. 4 utilizes the model-view-controller objects in order to provide distributed instant messaging application services across the network. Hence, different service objects may be executed by respective network nodes; moreover, as described below with respect to FIG. 5, any one of these service objects may be transferred to another network node, without interruption of user service, in response to a prescribed condition such as node failure, depletion of node resources, etc.

As illustrated in FIG. 4, the instant messaging application service 200 includes locally executable service objects 202 that are executable within the client IP telephony device 10. The application service 200 also includes service objects 204 that are executed remote to the client device 10, separated by a line 206 designating the network interface boundary between the operations internal to the Voice over IP telephony device 10 and processes executed by nodes 10' or 12 reachable via the IP network 14.

The instant messaging application 200 is divided into a message transfer service and a presence management service. In particular, the presence management service, configured for identifying for subscribers present to receive a message, includes a controller object 202a, a model object 202b and a view object 204a. The controller object 202a is configured for allowing the user to change his or her presence state, for example logged in, logged out, out to lunch, etc.; the user may change his or her presence state based on pressing the appropriate key 122 or 126, as programmed by the controller 202a. In response to the user pressing an input key specifying a change in presence state, a controller 202a sends a service transaction message to the model 202b requesting a change in the user's presence status. Although the model object 202 is illustrated as resident on the client device 10, it would be readily apparent that the model object 202b may be executed remotely, for example on the presence server 12c illustrated in FIG. 2. In addition, the controller object 202a may reside in another device 12 configured for detecting the user's presence as described in the above-incorporated application Ser. No. 09/908,578.

The model object 202b, in response to receiving the service transaction message from the controller 202a, updates its internal presence state for the user based on its prescribed application logic, and outputs a service transaction message to the view object 204a configured for displaying a view of the user's presence state, for example on other client devices 10' of which the user is subscribed as a buddy.

Hence, the controller object 202a, the model object 202b, and the view object 204a exchange service transaction messages to provide presence management based on distributed execution of the respective service objects. As described below, the use of service transaction messages enables the transfer of any of the service objects to another node as necessary.

The messaging transfer service of the instant messaging application 200 is supplied to the user based on exchange of service transaction messages between the controller object 202c, the model object 204b, and the view object 202d. In particular the controller object 202c is configured for entering and sending instant messages generated by the user, for example using prescribed short hand messages using the keys 122 or 126, whereby manual entry of text using the alpha-numeric keypad 126a. Alternately the controller object 202c could reside on another device, for example the user's PC, or another IP-capable data entry device separate from the VoIP telephony device 10. The instant message is sent to the model object 204b configured for storing presence data for the user's subscribers, and also configured for forwarding instant messages. The model object 204b processes the service transaction specifying the instant message and the intended recipient, and updates the view object 202d. Note that the view object 202d displays the sent message on the local device 10, and also will display any messages sent from other buddies.

As apparent from the foregoing, multiple view objects may be used from a single model object in the case of multiple users that subscribe to a prescribed group. In addition, multiple controller objects may be used to control a given model object. As shown in FIG. 4, the model object 202b also is responsive to a separate controller 204c configured for monitoring the network connection of the client device 10; hence, if the user connection has dropped, the controller 204c would send a service transaction message to either the model 202b, or to another model object, described below, specifying that the presence status for the subscriber should be changed due to the lost user connection. As apparent from the description below, any service objects resident on the client device 10 could be automatically transferred (e.g., by the service provider 12e) to another user device (e.g., a wireless personal digital assistant) to resume service.

Figure 5A:
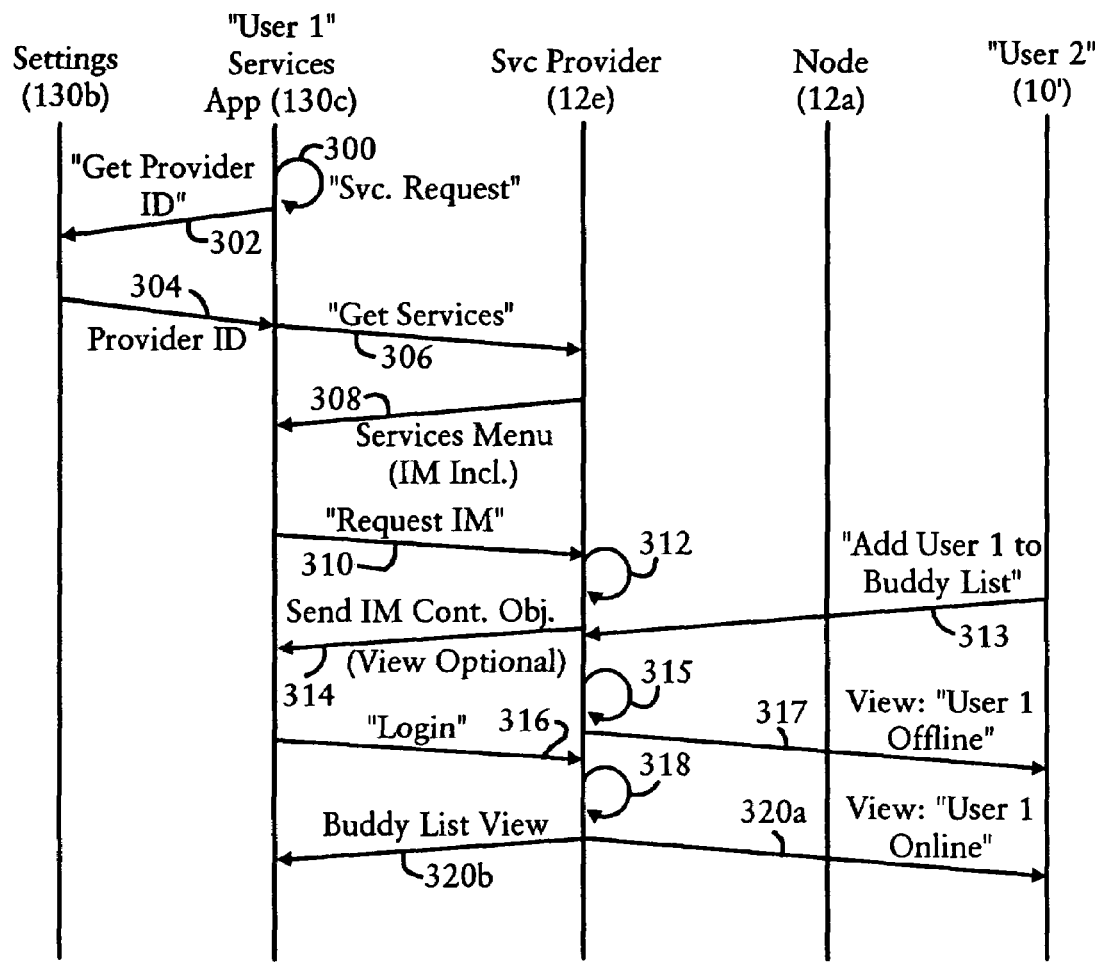
FIGS. 5A and 5B are diagrams summarizing a method of providing network services based on transfer of selected service objects between network nodes without interruption of user service, according to an embodiment of the present invention.
Figure 5B:
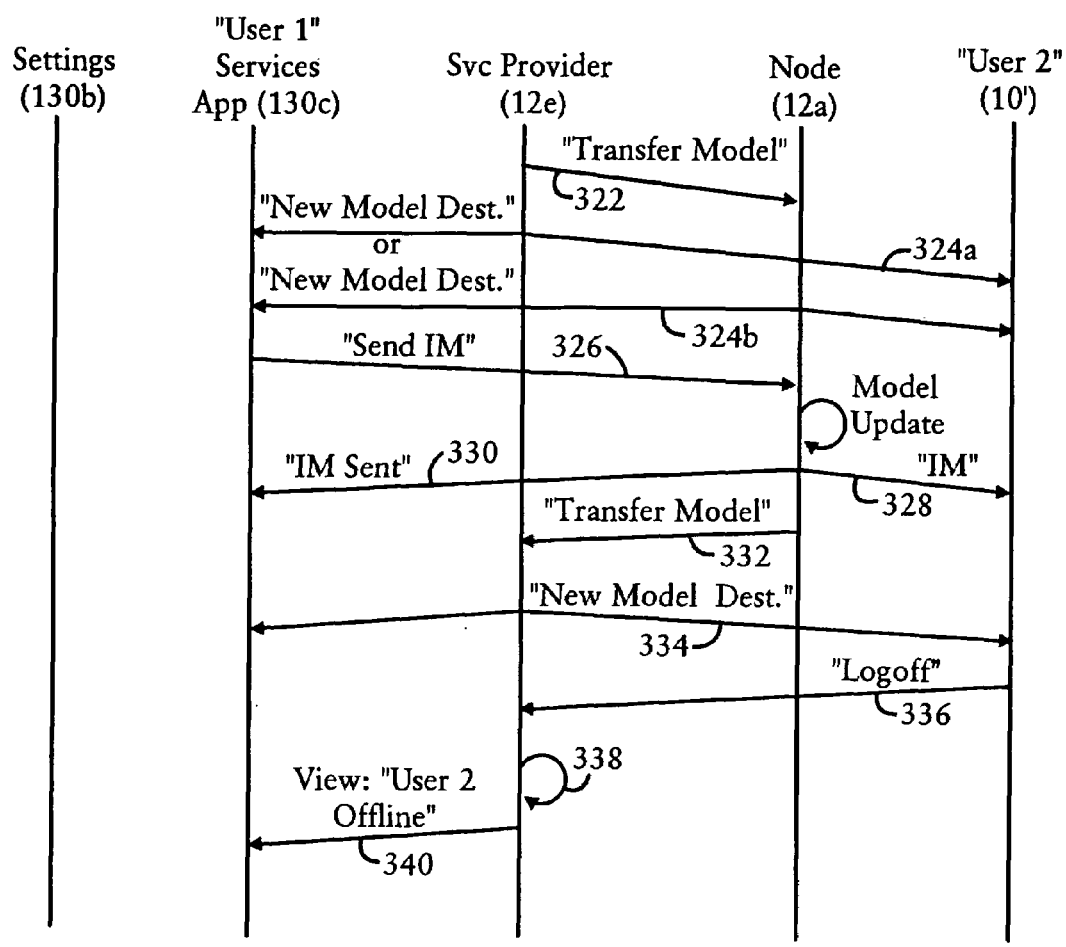

FIGS. 5A and 5B are diagrams illustrating the method of providing a network service to a network enabled user interface device 10 based on exchange of service transaction messages between service objects, and transferring a service object to another network node without interruption in service, according to an embodiment of the present invention. The steps described in FIGS. 5A and 5B can be implemented as executable code stored on a computer readable medium (e.g., a hard drive, a floppy drive, a random access memory, a read only memory, an EPROM, a compact disk, etc).

The method begins in step 300, where the services application 130c, configured for maintaining inventory of available network services for the user, receives a request by the user ("User 1") to add services. The services application 130c identifies the server address of the network node 12 for any necessary services queries. Note that the destination may be the same for all services, or may be different for respective services, where multiple destination may be accessed for respective requests. In particular, the services application 130c obtains the service provider address identified in step 302 from the settings application 130b, which is configured as an overall manager accessible by other application to obtain basic data, including device ID, network configuration, etc. The settings application 130b provides the destination address for retrieving new services to the services application 130c in step 304, enabling the services application 130c to request a menu of available services in step 306 from the appropriate service provider, for example the call server 12e of FIG. 2. The services provider 12e, also referred to as a service node, is configured for configuring the Voice over IP telephony device 10 to provide the instant messaging service. In particular, the service provider 12e sends in step 308 the services menu as an XML document listing available services, including instant messaging (assuming the device manager 130b does not include a listing of services). For example, the services application 130c may present a menu to the user listing current services and available services, for example directory services, calendar, stock quote and instant messaging. The user, upon reviewing the services menu, presses the appropriate button to select the instant messaging application, causing the services application 130c to post a request in step 310 requesting the instant messaging application.

The services node 12e evaluates in step 312 the capabilities of the device 10, and sends in step 314 the selected service object to the Voice over IP telephony device 10. For example, the service node 12e may send only the controller 202c, assuming that the controller object 202a, the model object 202b, and the view object 202d are to reside on different devices; alternately, for the Voice over IP telephony device 10, the service node 12e may send down the service objects 202a, 202b, 202c, and 202d as illustrated in FIG. 4 in order to maximize the features set available locally on the telephony device 10.

In response to receiving the selected service objects, the services application 130c loads the services object 202 into the application controller 128 and/or the GUI controller 125.

At the same time, note that the controller object resident in the client device 10' may send a service transaction message in step 313 (based on input by User 2) to add the User 1 to his or her buddy list; the model object 202b resident in the node 12e updates its state in step 315 and sends a service transaction message in step 317 specifying for the user object 204a the presence status of User 1 (e.g., offline).

In response to the User 1 logging into the instant messaging service, the controller object 202a sends a service transaction message in step 316 to the model object 202b configured for storing presence information, illustrated in FIG. 5 as residing on the service provider node 12e. The model object 202b updates in step 318 the presence information for the user, and sends in step 320 a service transaction message to all affected view objects; for example, the model object 202b sends in step 320a service transaction message to update the view object 204a, executed on a buddy device 10'. The model object also sends in step 320b a service transaction message to the view object 202d resident in the user device 10, indicating the user is active online.

Assume now that the model object 202b resident in the service provider 12e needs to be transferred due to a detected failure by the node 12e. For example, the node 12e may detect a power failure from an uninterruptible power supply (UPS), indicating power will soon be terminated. In this case, the node 12e sends in step 322 a message to the call server 12a specifying that all model object operations needs to be transferred. The service provider 12e transfers in step 322 any necessary data (e.g., state and logic information) associated with the model 202b to the call server 12a, enabling the call server 12a to continue model object operations. The relevant controller objects (e.g., 202a, 202c, and/or 204c) are then notified in step 324a by the service provider 12e, or the call server 12a in step 324b, that all subsequent service transaction messages need to be sent to the call server 12a instead of the call server 12e.

The transfer of the model object 202b is performed in between view object transactions, hence, the transfer is performed in steps 322 and 324 on the order of milliseconds, while maintaining a user-perceived continuous service of the instant messaging service. Hence, the users do not perceive any interruption in service. Consequently, the controller object 202c sends in step 326 a service transaction message carrying an instant message to the call server 12a, which enables the model object 202b executing to update the state information, and send in step 328 a service transaction message including the instant message to the second user at device 10'. Another service transaction message can be sent in step 330 displaying the sent message by the view object 202d residing on the user's device 10.

Assume now that the call server 12a transfers the model object 202b back to the original call server 12e in step 332. In this case, either the call server 12a or the call server 12e notifies in step 334 all of the relevant controller objects that the new model destination is the call server 12e, superceding the prior assignment to the call server 12a. Hence, any subsequent service transaction messages, for example by the controller object within the user device 10' indicating a change in user presence state (e.g., user log off), are sent to the service provider 12e in step 336. The model object 202b residing in the call server 12e updates in steps 338 the appropriate state information, including presence data, and sends in step 340 a service transaction message for the view object 202d to display that the user (User 2) of the device 10' has logged out.

According to the disclosed embodiment, a service provider may deploy network based services based on deploying model, view, and controller objects in different network nodes. Moreover, the exchange of service transaction messages by the model object, the view object, and the controller object enable discreet transactions to be performed in providing user services, while transferring these services objects as necessary to different network nodes while maintaining the user's perception of continual service to ensure the user does not perceive any interruption in service.

Although the disclosed arrangement has been described in context of implementing an instant messaging application, numerous other network services may be provided, for example utilizing different view object or controller objects based on network topology or hardware configuration. In addition, these services objects may be moved, as desired, to optimize resources within different network nodes throughout the network.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network-enabled user interface device, the device including:
   at least one user interaction component of a user input resource configured for receiving user inputs, and a display controller configured for display of data;
   a network interface configured for receiving, via an open protocol network, information associated with a first network service, the first network service supplied to the user based on interaction exchange of service transaction messages between a model object, a view object, and a controller object each associated with the first network service, the network interface configured for receiving at least one of the model object, the view object, or the controller object associated with the first network service via the open protocol network based on the at least one user interaction component; and
   a controller configured for executing the received at least one model object, view object, or controller object associated with the first network service for providing the first network service to the user based on the exchange of the service transaction messages, the controller configured for selectively terminating the received at least one model object, view object, or controller object associated with the first network service based on reception, via the network interface and the open protocol network, of one of a model object, a view object, or a controller object each associated with a corresponding second network service.

2. The device of claim 1, wherein the device includes the user input resource as the at least one user interaction component, the network interface configured for receiving the controller object as the received at least one model object, view object, or controller object associated with the first network service, the controller configured for executing the controller object associated with the first network service based on supplying, via the network interface, a first service transaction message to the model object associated with the first network service and executed remotely at a prescribed destination on the open protocol network based on a corresponding user input detected by the user input resource.

3. The device of claim 2, wherein the device is configured for providing the first network service based solely on execution of the controller object associated with the first network service, wherein the model object associated with the first network service and view object associated with the first network service are executed remotely relative to the device.

4. The device of claim 2, wherein the network interface is configured for receiving the model object associated with the first network service from the open protocol network, the controller configured for executing the model object associated with the first network service locally and redirecting the first service transaction messages generated by the controller object associated with the first network service from the model object associated with the first network service and having been executed remotely to the model object associated with the first network service and executed locally, the model object associated with the first network service and executed locally outputting second service transaction messages, based on the redirected first service transaction messages, to the view object associated with the first network service.

5. The device of claim 4, wherein the controller, in response to receiving a message via the network specifying a new remote model object associated with the first network service and superseding the model object associated with the first network service and executed locally, redirects the first service transaction messages generated by the controller object to the new remote model object via the network interface.

6. The device of claim 5, wherein the first network service provides sending of instant messages to remote users.

7. A method in a network-enabled user interface device, the method including:
   receiving, via an open protocol network, at least one of a model object, a view object, or a controller object each associated with a first network service;
   executing the received at least one model object, view object, or controller object associated with the first network service, for providing the first network service to the user based on exchange of service transaction messages between the model object, the view object, and the controller object associated with the first network service, the executing including at least one of generating or receiving one of the service transaction messages based on a corresponding at least one user interaction component, the one user interaction component being one of a user input resource configured for receiving user inputs or a display controller configured for display of data; and
   selectively terminating the received at least one model object, view object, or controller object associated with the first network service based on reception, via the open protocol network, of one of a model object, a view object, or a controller object each associated with a corresponding second network service.

8. The method of claim 7, wherein the device includes the user input resource, the receiving including receiving the controller object as the received at least one model object, view object, or controller object associated with the first network service, the executing including:
   generating, by the controller object associated with the first network service, a first service transaction message for the model object associated with the first network service based on a corresponding user input detected by the user input resource, and
   sending via the open protocol network the first service transaction message to the model object associated with the first network service.

9. The method of claim 8, wherein the executing includes providing the first network service based solely on execution in the device of the controller object associated with the first network service, wherein the model object associated with the first network service and the view object associated with the first network service are executed remotely relative to the device.

10. The method of claim 8, wherein the receiving further includes receiving the model object associated with the first network service from the open protocol network, the executing including:
   redirecting the first service transaction messages generated by the controller object associated with the first network service from the model object associated with the first network service and having been executed remotely to the model object associated with the first network service and executed locally, and outputting, by the model object associated with the first network service and executed locally, second service transaction messages to the view object associated with the first network service based on the redirected first service transaction messages.

11. The method of claim 10, wherein:
the receiving further includes receiving a message via the network specifying a new remote model object associated with the first network service and superseding the model object associated with the first network service and executed locally;
the executing includes redirecting the first service transaction messages to the new remote model object associated with the first network service via the network, and terminating execution of the model object associated with the first network service and executed locally.

12. The method of claim 11, wherein the first network service provides sending of instant messages to remote users.

13. The method of claim 7, wherein the receiving, executing and selectively terminating each are executed by the network-enabled user interface device.

14. An open protocol network configured for providing network services to a user, the network comprising:
a network-enabled user interface device configured for user interaction by at least one of receiving user inputs or displaying data; and
a service node configured for configuring the network-enabled user interface device to provide a first network service, the first network service generated based on exchange of service transaction messages between a model object, a view object, and a controller object each associated with first network service, the service node configured for:
(1) supplying to the network-enabled user interface device via the open protocol network at least one of the model object, the view object, or the controller object associated with the first network service based on the user interaction capabilities of the network-enabled user interface device, and
(2) transferring a selected one of the model object, the view object, or the controller object associated with the first network service via the open protocol network and between any one of the service node, the network-enabled user interface device, or a second network node based on a prescribed condition and while maintaining a user-perceived continuous service of the first network service.

15. The network of claim 14, wherein the network-enabled user interface device is configured for receiving the controller object from the service node as the supplied at least one model object, view object, or controller object, the controller object during execution by the network-enabled user interface device outputting to the model object a first service transaction message based on a corresponding user input detected by the network-enabled user interface device.

16. The network of claim 15, wherein the service node is configured for transferring the selected one of the model object, the view object, or the controller object associated with the first network service based on outputting the model object to the one node for execution, and sending a message to the controller object associated with the first network service identifying the one node as a new destination for the controller message.

17. The network of claim 16, wherein at least one of the service node or the one node is configured for transferring the selected one of the model object, the view object, or the controller object associated with the first network service to a second node based on sending a second message to the controller object identifying the second node as a second destination for the controller message that supersedes the new destination.

18. The network of claim 17, wherein the model object is supplied to the second node by any one of the service node or the one node based on a prescribed condition.

19. The network of claim 18, wherein the first network service is an instant messaging service for transfer of messages between identified subscribers.

20. The network of claim 14, wherein the first network service is provided to the user of the network-enabled user interface device based on execution of the view object associated with the first network service by the network-enabled user interface device, the model object associated with the first network service by the service node, and the controller object associated with the first network service by the second network node.

21. A method in an open protocol network configured for providing network services to a user, the network comprising:
supplying a first network service to a network-enabled user interface device configured for user interaction by at least one of receiving user inputs or displaying data, the first network service generated based on exchange of service transaction messages between a model object, a view object, and a controller object each associated with the first network service, the supplying including supplying to the network-enabled user interface device at least one of the model object, the view object, or the controller object associated with the first network service via the open protocol network based on the user interaction capabilities of the network-enabled user interface device; and
transferring a selected one of the model object, the view object, or the controller object associated with the first network service via the open protocol network and between any one of a service node, the network-enabled user interface device, or a second network node based on a prescribed condition and while maintaining a user-perceived continuous service of the first network service.

22. The method of claim 21, wherein the supplying includes supplying the controller object to the network-enabled user interface device, the method further comprising outputting, by the controller object during execution by the network-enabled user interface device, a first service transaction message to the model object based on a corresponding received user input.

23. The method of claim 22, wherein the transferring includes transferring the model object to the one node for execution, and sending a message to the controller object identifying the one node as a new destination for the controller message.

24. The method of claim 23, further comprising moving the selected one of the model object, the view object, or the controller object associated with the first network service to a third network node based on sending a second message to the controller object identifying the third network node as a second destination for the controller message that supersedes the new destination.

25. The method of claim 24, wherein the transferring and moving each include transferring the model object by any one of the service node or the one node based on a prescribed condition.

26. The method of claim 21, further comprising providing the network services to the user based on execution of the view object by the network-enabled user interface device, the model object by the service node, and the controller object by the second network node.

27. The method of claim 21, wherein the supplying includes providing instant messaging as the first network service.

28. A network-enabled user interface device comprising:
  at least one user interaction component, the one user interaction component being one of a user input resource configured for receiving user inputs or a display controller configured for display of data;
  means for receiving, via an open protocol network, at least one of a model object, a view object, or a controller object each associated with a first network service; and
  means for executing the at least one model object, view object, or controller object associated with the first network service, for providing the first network service to the user based on exchange of service transaction messages between the model object, the view object, and the controller object associated with the first network service, the means for executing further configured for at least one of generating or receiving one of the service transaction messages based on the corresponding at least one user interaction component, the means for executing configured for selectively terminating the received at least one model object, view object, or controller object associated with the first network service based on reception, via the open protocol network, of a one of a model object, a view object, or a controller object each associated with a corresponding second network service.

* * * * *